(12) United States Patent
Corvasce et al.

(10) Patent No.: US 6,355,719 B1
(45) Date of Patent: Mar. 12, 2002

(54) HETEROGENEOUS SILICA CARBON BLACK-FILLED RUBBER COMPOUND

(75) Inventors: Filomeno Gennaro Corvasce, Mertzig; Giorgio Agostini, Colmar-Berg, both of (LU); Pierre Marie Jean Dauvister, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/627,292

(22) Filed: Jul. 28, 2000

Related U.S. Application Data

(62) Division of application No. 09/153,438, filed on Sep. 15, 1998, now Pat. No. 6,121,367
(60) Provisional application No. 60/059,671, filed on Sep. 18, 1997.

(51) Int. Cl.[7] .................................. C08K 3/04
(52) U.S. Cl. ........................ 524/492; 524/493; 524/495; 524/496
(58) Field of Search ................................ 524/492, 493, 524/495, 496

(56) References Cited

FOREIGN PATENT DOCUMENTS

| EP | 763558 | 9/1996 | ............. C08L/3/20 |
|---|---|---|---|
| EP | 791622 | 2/1997 | ........... C08K/5/372 |

*Primary Examiner*—Edward J. Cain
(74) *Attorney, Agent, or Firm*—Bruce J. Hendricks

(57) ABSTRACT

The present invention relates to a heterogeneous silica/carbon black-filled rubber compound and a process for making the same. The rubber compound has improved (lower) electrical resistivity compared to homogeneous silica-filled rubber compounds. The process comprises (a) intimately dispersing from 30 to 60 phr of a silica filler and 5 to 80 phr of a carbon black in a first rubber to form a first nonproductive compound;

(b) intimately dispersing curatives in said first nonproductive compound to form a first productive compound;

(c) separately intimately dispersing from 20 to 100 phr of a silica filler in a second rubber, which is different from said first rubber, to form a second nonproductive compound; and (d) intimately dispersing curatives in said second nonproductive compound to form a second productive compound; and (e) mixing said first productive compound with said second productive compound to form a heterogeneous silica/carbon black-filled rubber compound.

20 Claims, No Drawings

HETEROGENEOUS SILICA CARBON BLACK-FILLED RUBBER COMPOUND

This is a divisional of application Ser. No. 09/153,438, filed on Sep. 15, 1998, now U.S. Pat. No. 6,121,367 presently pending which claims priority to U.S. Provisional Application Serial No. 60/059,671, filed Sep. 18, 1997.

BACKGROUND OF THE INVENTION

There has recently developed trends in some tire markets for silica-based tread markets. With this trend, increasing levels of silica have been used with concomitant reductions in the levels of carbon black. As one increases the level of silica in a rubber with decreasing levels of carbon black, the electrical resistivity of the rubber increases. This is undesirable when the rubber is used in a tire due to the potential building of static electricity in the vehicle on which the tires are mounted. While it is described in some instances to use silica fillers, it is also desirable to avoid the potential problems when the carbon black levels are decreased.

SUMMARY OF THE INVENTION

The present invention relates to heterogeneous silica/carbon black-filled rubber compounds and a process for making such compounds.

DETAILED DESCRIPTION OF THE INVENTION

There is disclosed a process for the production of a heterogeneous silica/carbon black-filled rubber compound comprising
- (a) intimately dispersing from 30 to 60 phr of a silica filler and 5 to 80 phr of a carbon black in a first rubber to form a first nonproductive compound;
- (b) intimately dispersing curatives in said first nonproductive compound to form a first productive compound;
- (c) separately intimately dispersing from 20 to 100 phr of a silica filler in a second rubber, which is different from said first rubber, to form a second nonproductive compound;
- (d) intimately dispersing curatives in said second nonproductive compound to form a second productive compound; and
- (e) mixing said first productive compound with said second productive compound to form a heterogeneous silica/carbon black-filled rubber compound.

There is also disclosed a heterogenous silica black-filled rubber compound prepared by a process comprising
- (a) intimately dispersing from 30 to 60 phr of a silica filler and 5 to 80 phr of a carbon black in a first rubber to form a first nonproductive compound;
- (b) intimately dispersing curatives in said first nonproductive compound to form a first productive compound;
- (c) separately intimately dispersing from 20 to 100 phr of a silica filler in a second rubber, which is different from said first rubber, to form a second nonproductive compound;
- (d) intimately dispersing curatives in said second nonproductive compound to form a second productive compound; and
- (e) mixing said first productive compound with said second productive compound to form a heterogeneous silica/carbon black-filled rubber compound.

The present invention relates to heterogeneous silica/carbon black-filled rubber compound. Heterogeneous as used herein means containing dissimilar ingredients and/or levels of ingredients. More specifically, the term means a rubber compound containing the selective dispersion of silica and carbon black in a first rubber and silica in a second rubber. Thereafter, upon adding curatives to each rubber compound and the subsequent mixing of the two productives, there is a higher concentration of the carbon in one phase, resulting in improved conductivity of the overall rubber compound and more optimum curing of each of the two phases.

One critical aspect of the present invention is that the first rubber and second rubber are different. Even though the two rubbers are different, each of the two rubbers may be selected from the same group of rubbers. The first rubber and second rubber may be selected from the group consisting of emulsion polymerized styrene/butadiene copolymers, solution polymerized styrene/butadiene copolymers, natural rubber, cis 1,4-polybutadiene, synthetic cis 1,4-polyisoprene, styrene/isoprene copolymers, 3,4-polyisoprene, isoprene/butadiene copolymers, medium vinyl polybutadiene (20 percent to 60 percent by weight of vinyl units), styrene/isoprene/butadiene terpolymers, butyl rubber, polychloroprene, acrylonitrile/butadiene copolymers and ethylene/propylene/diene terpolymers and mixtures thereof.

In accordance with a preferred embodiment of the present invention, the first rubber (used to make the first nonproductive) and the second rubber (used to make the second nonproductive) have different glass transition temperatures (Tg). The term "Tg" refers to the glass transition temperature of the identified rubber and is suitably determined by a differential scanning calorimeter at a rate of 10° C. per minute. In a particularly preferred embodiment, the Tg of the first rubber is higher than the Tg of the second rubber. For example, the Tg of the first rubber may range from −50° C. to 0° C. (high Tg rubber) and the Tg of the second rubber may range from −100° C. to −51° C. (low Tg rubber). In accordance with this embodiment, the difference between the Tg of the first and second rubber generally ranges from about 60° C. to 0° C.

Representative examples of high Tg rubbers include 3,4 polyisoprene which typically contains about 65 weight percent 3,4-isoprene units and has a Tg of about −16° C. Another example of a high Tg rubber is a solution-polymerized styrene/butadiene copolymer rubber containing 12 weight percent styrene, a vinyl content of about 40 weight percent, a Tg of −45° C. and a Mooney viscosity (ML 1+4) at 100° C. of 90. Another high Tg rubber is a styrene/isoprene/butadiene terpolymer rubber containing 20 weight percent styrene, 40 weight percent isoprene and 40 percent butadiene, a Tg of −42° C. and a Mooney viscosity at 100° C. of 90. Yet another high Tg rubber is a high cis 1,4-polybutadiene rubber characterized by the weight percent of 1,4-bonds of at least 9 percent. Another high Tg rubber is a solution-polymerized medium cis 1,4-polybutadiene 40 to 60 weight percent of the units of a vinyl 1,2-structure and 35 to 45 weight percent of its units of a cis 1,4-structure. Such solution-polymerized polybutadiene has a Tg of −65° C and Mooney viscosity (ML 1+4) at 100° C. of about 44. Additional examples of high Tg rubbers are emulsion-polymerized styrene/butadiene copolymer rubber characterized by a weight percent of from 23.5 to 40 weight percent styrene. For example, an emulsion-polymerized styrene/butadiene copolymer rubber having 23.5 weight percent styrene typically has a Tg of about −55° C. An emulsion-polymerized styrene/butadiene copolymer rubber having 40 weight percent styrene typically has a Tg of about −32° C. to −35° C. The preferred high Tg rubber will depend on the application of the rubber compound of the present invention.

Representative examples of the low Tg rubber include polybutadiene rubber having 95 weight percent or more cis 1,4-structure, a Tg of from −95° C. to −105° C. and a Mooney viscosity (ML 1+4) at 100° C. of 5 from 30 to 100. Another example of a low Tg rubber is an isoprene/butadiene copolymer rubber prepared by neodymium catalysis and characterized by having an isoprene content of about 20 weight percent, a Tg of about −90° C. and a Mooney viscosity (ML 1+4) at 100° C. of 82. Yet another example is an isoprene/butadiene copolymer rubber prepared by neodymium catalysis and characterized by having an isoprene content of about 10 weight percent, a Tg of about −98° C. and a Mooney viscosity (ML 1+4) at 100° C. of 82. Other examples of suitable rubbers are solution-polymerized styrene/butadiene copolymer rubbers containing up to 10 weight percent of styrene. Such styrene/butadiene copolymers exhibit a Tg of from −93° C. to −80° C. and Mooney viscosities (ML 1+4) at 100° C. from 30 to 100. The preferred low Tg rubber will depend on the application of the rubber compound of the present invention.

Another example is cis 1,4-polyisoprene. The cis 1,4-polyisoprene rubber includes both natural and synthetic rubbers. The cis 1,4-polyisoprene rubber, natural or synthetic, typically has a cis 1,4-content of about 96 to about 99 weight percent. Synthetic cis 1,4-polyisoprene generally has a Tg of about −65° C. Natural rubber typically has a Tg of about −65° C. Typical Mooney viscosities (ML 1+4) at 100° C. for synthesis cis 1,4-polyisoprene and natural rubber range from 30 to 100. Another low Tg rubber is an isoprene/butadiene copolymer rubber prepared by neodymium catalysis characterized by an isoprene content of about 70 weight percent, a Tg of about −79° C. and a Mooney viscosity (ML 1+4) at 100 ° C. of 76. Another low Tg rubber is solution-polymerized styrene/butadiene copolymer rubber having a styrene content of about 18 weight percent, a vinyl content of about 10 weight percent, a Tg of about −78° C. and a Mooney viscosity (ML 1+4) at 100° C. of 85.

In addition to the first rubber in the first nonproductive, another rubber may also be present. In those instances where two or more rubbers are used in the first nonproductive, the first rubber should be used in an amount ranging from about 30 to 80 parts by weight per 100 parts by weight of the total rubber (phr), based on the first nonproductives. Preferably, the first rubber should be present in the first nonproductive in an amount ranging from about 40 to 60 phr. Therefore, if one or more rubbers are used in addition to the first rubber to make the first nonproductive, the total level of such rubbers(s) in the overall heterogenous blend which are derived from the first nonproductive should range from 20 to 80 phr, with a range of from 40 to 60 phr being preferred.

In those instances where another rubber or rubbers are used in the first nonproductive, it is preferred to observe the same guidelines as to selection of the first rubber; namely, with respect to the described Tg guidelines.

Similarly, the second rubber in the second nonproductive, another rubber may also be present. In those instances where two or more rubbers are used in the second nonproductive, the second rubber should be used in an amount ranging from about 20 to 70 parts by weight per 100 parts by weight of total rubber (phr), based on the second nonproductive. Preferably, the second rubber should be present in the second nonproductive in an amount ranging from about 40 to 60 phr. Therefore, if one or more rubbers are used in addition to the second rubber to make the second in the overall heterogeneous blend which are derived from the second nonproductive, the total level of such rubbers(s) should range from 20 to 80 phr, with a range of from 40 to 60 phr being preferred.

In those instances where another rubber or rubbers are used in the second nonproductive, it is preferred to observe the same guidelines as to selection of the second rubber; namely, with respect to the described Tg guidelines.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The Rhone-Poulenc Z1165MP silica is currently preferred.

The silica is added to both the first and second nonproductive compounds. The level of silica that is present in the first nonproductive may range from about 30 to 60 phr, based on the total rubber in the first nonproductive. Preferably, the level of silica that is added to the first nonproductive ranges from 40 to 60 phr. The level of silica that is present in the second nonproductive may range from about 20 to 100 phr, based on the total rubber in the second nonproductive. Preferably, the level of silica that is added to the second nonproductive ranges from 60 to 80 phr.

The silica is intimately dispersed in the first nonproductive compound and the second nonproductive compound. The mixing may be accomplished by methods known to those skilled in the rubber mixing art. For example, fixed and variable speed mixers or Banburys™ may be used. The first rubber and silica as well as the second rubber and silicas are mixed in a nonproductive mix stage. The silica and first rubber as well as the silica and second rubber are mixed for a time and temperature to intimately disperse the silica. For example, mixing at a rubber temperature from 130 to 180° C. for a period of from 10 seconds to 20 minutes.

In addition to the first rubber or second rubber (as well as the optional rubbers as described above) and silica, a silica coupling agent may be present in the first nonproductive compound and second nonproductive compound. The silica coupling agent is used to promote the interaction of the silica and the rubber. Various known silica couplers may be used.

One example of a silica coupler is a sulfur containing organosilicon compound. Examples of sulfur containing organosilicon compounds are of the formula:

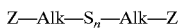

in which Z is selected from the group consisting of

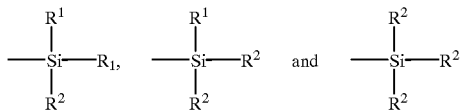

where
- $R^1$ is an alkyl group of 1 to 4 carbon atoms, cyclohexyl or phenyl;
- $R^2$ is alkoxy of 1 to 8 carbon atoms, or cycloalkoxy of 5 to 8 carbon atoms;
- Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)tetrasulfide, 3,3'-bis (triethoxysilylpropyl)octasulfide, 3,3'-bis(trimethoxy- silylpropyl)tetrasulfide, 2,2'-bis(triethoxysilylethyl) tetrasulfide, 3,3'-bis(trimethoxysilylpropyl)trisulfide, 3,3'- bis(triethoxysilylpropyl)trisulfide, 3,3'-bis(tributoxysilyl- propyl)disulfide, 3,3'-bis(trimethoxysilylpropyl)hexasulfide, 3,3'-bis(trimethoxysilylpropyl)octasulfide, 3,3'-bis (trioctoxysilylpropyl)tetrasulfide, 3,3'-bis(trihexoxysilyl- propyl)disulfide, 3,3'-bis(tri-2"-ethylhexoxysilylpropyl) trisulfide, 3,3'-bis(triisooctoxysilylpropyl)tetrasulfide, 3,3'- bis(tri-t-butoxysilylpropyl)disulfide, 2,2'-bis(methoxy diethoxy silyl ethyl)tetrasulfide, 2,2'-bis(tripropoxysilyl- ethyl)pentasulfide, 3,3'-bis(tricyclonexoxysilylpropyl) tetrasulfide, 3,3'-bis(tricyclopentoxysilylpropyl)trisulfide, 2,2'-bis(tri-2"-methylcyclohexoxysilylethyl)tetrasulfide,bis (trimethoxysilylmethyl)tetrasulfide, 3-methoxy ethoxy pro- poxysilyl 3'-diethoxybutoxysilylpropyltetrasulfide, 2,2'-bis (dimethyl methoxysilylethyl)disulfide, 2,2'-bis(dimethyl sec.butoxysilylethyl)trisulfide, 3,3'-bis(methyl butylethoxy- silylpropyl)tetrasulfide, 3,3'-bis(di t-butylmethoxysilyl- propyl)tetrasulfide, 2,2'-bis(phenyl methyl methoxy- silylethyl)trisulfide, 3,3'-bis(diphenyl isopropoxysilyl- propyl)tetrasulfide, 3,3'-bis(diphenyl cyclohexoxysilyl- propyl)disulfide, 3,3'-bis(dimethyl ethylmercaptosilyl- propyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl)disulfide, 3,3'- bis(butyl dimethoxysilylpropyl)trisulfide, 3,3'-bis(phenyl dimethoxysilylpropyl)tetrasulfide, 3-phenyl ethoxybutox- ysilyl 3'-trimethoxysilylpropyl tetrasulfide, 4,4'-bis (trimethoxysilylbutyl) tetrasulfide, 6,6'-bis(triethoxy- silylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl)disulfide.

The preferred sulfur containing organosilicon compounds are the 3,3'-bis(trimethoxy or triethoxy silylpropyl)sulfides. The most preferred compound is 3,3'-bis (triethoxysilylpropyl)tetrasulfide. Therefore, as to the above formula, preferably Z is

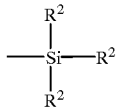

where $R^2$ is an alkoxy of 2 to 4 carbon atoms, with 2 carbon atoms being particularly preferred; Alk is a divalent hydro- carbon of 2 to 4 carbon atoms with 3 carbon atoms being particularly preferred; and n is an integer of from 2 to 5 with 4 being particularly preferred.

The amount of the sulfur containing organosilicon com- pound in a rubber composition will vary depending on the level of silica that is used. Generally speaking, the amount of the organosilicon compound will range from 0.5 to 50 phr. Preferably, the amount will range from 1.5 to 8 phr. Depend- ing on the desired properties, the weight ratio of the sulfur containing organosilicon compound to silica may vary. Generally speaking, the weight ratio will range from 1:100 to 1:5. Preferably, the weight ratio will range from 1:20 to 1:10.

In the second critical step of the present invention, carbon black is intimately dispersed along with the silica in the first rubber, which is different from the first rubber, to form the first nonproductive compound. Typical amounts of reinforcing-type carbon black(s), range from 5 to 80 phr. Preferably, the carbon black level ranges from 20 to 50 phr. Representative of the carbon blacks which may be used in the present invention include those known to those skilled in the art under the ASTM designations N110, N121, N220, N231, N234, N242, N293, N299, S315, N326, N330, N332, N339, N343, N347, N351, N358, N375 and mixtures thereof. Carbon fibers may also be added to the rubber compound.

The weight ratio of silica to carbon black in the overall heterogeneous silica carbon black-filled rubber compound may vary. For example, the weight ratio of silica to carbon black may be as low as 1:5 to 30:1. Preferably, the weight ratio of silica to carbon black ranges from 2:1 to 6:1.

Essentially all of the carbon black that is added to the first nonproductive, with the exception of those rubber chemicals, such as sulfur containing organosilicons which are dispersed on carbon black and added at a different stage of mixing or to the second nonproductive. Preferably from 80 to 100 weight percent of the total carbon black is added to the first rubber not including the carbon black used as a carrier.

Both the first nonproductive compound and second non- productive compound may contain various commonly used additive materials such as, for example, processing additives such as oils, resins including tackifying resins and plasticizers, pigments, fatty acid, zinc oxide, waxes, anti- oxidants and antiozonants and peptizing agents. Depending on the intended use of the heterogeneous silica/carbon black-filled rubber compound, the additives mentioned above are selected and commonly used in conventional amounts. Typical amounts of tackifier resins, if used, com- prise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typi- cal amounts of antioxidants comprise about 1 to about 5 phr. Representative antioxidants may be, for example, diphenyl- p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The above additives may be mixed in the first nonproductive compound or second nonproductive compound in any ratio and due to the different compounds will be used at different levels.

The above conventional ingredients may also be added to subsequent mixes including the productive step.

Once the first nonproductive compound and second nonproductive has been prepared, the two productive compounds are prepared separately. The productive step involves a mixing stage where the curatives are added. For example, sulfur donors or sulfur vulcanizing agents include elemental sulfur (free sulfur), an amine disulfide, polymeric polysulfide and sulfur olefin additives. Preferably, the sulfur vulcanizing agent is elemental sulfur. The sulfur vulcanizing agent may be used in an amount ranging from 0.5 to 8 phr, with a range of from 0.5 to 4 being preferred. Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The curatives that are added to make the first productive compound may be the same or different and/or used at different levels. Preferably, each productive compound has a curative particularly designed for it based on the rubbers used as well as other ingredients present.

The curatives, including sulfur vulcanizing agents, are separately mixed with the first and second nonproductive compounds. Mixing of a nonproductive compound with curatives is conventionally called "productive" mix stage. Productive mixing typically occurs at a temperature, or ultimate temperature lower than the mix temperature(s) of the preceding nonproductive stage(s) and always below the subsequent cure temperatures. Typical mixing of the productive compound is at a rubber temperature ranging from 90 to 110° C. for a period of 30 seconds to 3 minutes.

After the first and second productive compounds have been prepared, the two productive stocks are mixed together. It is preferred to have as little mixing as possible to maintain the heterogeneous nature of the overall rubber. As can be appreciated, the more mixing the more homogeneous the rubber will be, resulting in each of the productive compounds losing their identity to the other.

Generally speaking, the two productive stocks are mixed in conventional equipment such as an extruder, mill or Banbury.

The overall heterogeneous rubber may contain various weight percentages of the first productive rubber and second productive rubber. Generally speaking, the heterogeneous rubber contains from about 40 to 80 parts by weight of the first productive rubber and from 60 to 20 parts by weight of the second productive rubber. Preferably, the heterogeneous rubber contains from about 60 to 80 parts by weight of the first productive rubber and from 40 to 20 parts by weight of the second productive rubber.

Vulcanization of the rubber composition of the present invention is generally carried out at conventional temperatures ranging from 130° C. to 200° C. Preferably, the vulcanization is conducted at temperatures ranging from 140° C. to 160° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a pneumatic tire, belt, hose, air spring, shoe product and motor mount. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

The following tables report conductivity properties that were determined from the rubber stocks that were prepared.

EXAMPLE 1

Tables 1 and 2 compare standard "all-in" mixed compound (Control) versus a phase-mixed compound (Sample 3) which are of the same formulations (61.9/13.3 phr silica/carbon black). All of the ingredients in the Control were mixed in one nonproductive step and one productive. In Samples 1 and 2 involved, two separate nonproductive steps followed by two separate production steps were used. In each nonproductive mixing step, a Kobe™ BB-2 mixer was used. The nonproductive step of all compounds containing silica (Standard and Nonproductives A and B) utilized variable speed mixing.

For Control, the rubber was loaded and mixed at 60 RPM. After 30 seconds, all of the silica coupler and one-half of the silica filler was added. After 60 seconds, the remaining silica, carbon black and other additives were loaded. Once the rubber temperature reached 160° C., the rotor speed was adjusted to maintain 160° C. for 2 minutes. The nonproductive compound was then discharged.

For the Nonproductive A step in Sample 1, the above procedure was repeated except no carbon black was added.

For the Nonproductive B step in Sample 2, the mixing was at 55 rpm. The rubber, carbon black, silica and remaining additives were loaded. After 150 seconds, the rubber temperature was approximately 170° C., the mixing was stopped and its contents removed.

For the Productive step for Control, one-half of the amount of the nonproductive mix was loaded along with the curatives followed by the remaining one-half of the nonproductive. Mixing was then commenced for approximately 2 minutes at 35 rpm. The rubber temperature reached approximately 90 to 100° C. and the load was discharged.

For the Productive A step for Sample 1, half the Nonproductive A was loaded along with the curatives followed by the remaining half of Nonproductive A. Similarly, for the Productive B step for Sample 2, half the Nonproductive B was loaded along with the curatives followed by the remaining half of Nonproductive B. Mixing was then commenced for both Productives approximately 2 minutes at 35 rpm. The rubber temperature reached approximately 90 to 100° C. and the loads was discharged. For Sample 3 (phase-mixed), 30 parts by weight of Productive A (Sample 1) and 70 parts by weight of Productive B (Sample 2) were then combined and mixed for approximately 2 minutes at 30 rpm. The rubber temperature reached 90° C. and the load was discharged.

TABLE 1

STANDARD VS PHASE-MIXED COMPOUNDS

| Sample | Control | Sample 1 | Sample 2 | Sample 3 |
|---|---|---|---|---|
| Mix Procedure Component | Standard Mixed Nonproductive | Nonproductive A | Nonproductive B | 30:70 Phase Mixed |
| Natural Rubber[1] | 10 | 33.33 | 0 | 10 |
| Polybutadiene[2] | 20 | 66.67 | 0 | 20 |
| IBR[3] | 45 | 0 | 64.28 | 45 |
| SBR[4] | 34.38 | 0 | 49.11 | 34.38 |
| Oil | 14 | 7 | 17 | 14 |
| Carbon Black[5] | 13.3 | 0 | 19 | 13.3 |
| Silica[6] | 61.9 | 50 | 67 | 61.9 |
| Silica Coupler[7] | 9.5 | 8 | 10.14 | 9.5 |
|  | Standard Mixed Productive | Productive A | Productive B | 30:70 Phase Mixed Productive |
| ZnO | 2.50 | 2.50 | 2.50 | 2.50 |
| Sulfur | 1.40 | 1.40 | 1.40 | 1.40 |
| Accelerator[8] | 1.65 | 1.43 | 1.74 | 1.65 |
| Accelerator[9] | 2.00 | 1.00 | 2.43 | 2.00 |
| Stearic Acid | 3.00 | 3.00 | 3.00 | 3.00 |

[1]SMR-20
[2]A solution-polymerized polybutadiene rubber having 96 weight percent cis 1,4-structure, a Tg of −104° C. and cis commercially available from The Goodyear Tire & Rubber Company as Budene ® 1207.
[3]An isoprene-butadiene copolymer prepared via solution polymerization. The IBR had a 50 percent by weight isoprene content, a 50 percent by weight butadiene content, a cis-1,4-bond content of 48 percent of −42° C.
[4]An emulsion-polymerized styrene/butadiene rubber having 40 percent by weight bound styrene, 37.5 phr of oil and a Tg of −32° C.
[5]N299 Black
[6]Zeosil 1165 MP commercially available from Rhone Poulenc
[7]3,3'-bis(triethoxysilylpropoyl) tetrasulfide on a carbon black carrier (50%—50% by weight) commercially obtained from Degussa under the commercial designation X50S
[8]N-cyclohexyl benzothiazole-2-sulfenamide
[9]diphenyl guanidine

| Sample Mix Procedure Component | Control Standard Mix Control | Sample 1 Productive A | Sample 2 Productive B | Sample 3 30:70 (A:B) Phase Mixed |
|---|---|---|---|---|
| Electrical Surface Resistivity (Ohms) | 1.2 E 14 | 2.7 E 16 | 5.3 E 5 | 2.9 E 7 |

What is claimed is:

1. A heterogeneous silica/carbon black-filled rubber compound prepared by a process comprising
   (a) intimately dispersing from 30 to 60 phr of a silica filler and 5 to 80 phr of a carbon black in a first rubber to form a first nonproductive compound;
   (b) intimately dispersing curatives in said first nonproductive compound to form a first productive compound;
   (c) separately and intimately dispersing from 20 to 100 phr of a silica filler in a second rubber, which is different from said first rubber to form a second nonproductive compound;
   (d) intimately dispersing curatives in said second nonproductive compound to form a second productive compound; and
   (e) mixing said first productive compound with said second productive compound to form a heterogeneous silica/carbon black-filled rubber compound.

2. The compound of claim 1 wherein said first rubber and said second rubber are selected from the group consisting of emulsion polymerized styrene/butadiene copolymers, solution polymerized styrene/butadiene copolymers, natural rubber, cis 1,4-polybutadiene, styrene isoprene copolymers, isoprene/butadiene copolymers, medium vinyl polybutadiene, styrene/isoprene/butadiene terpolymers, butyl rubber, polychloroprene, acrylonitrile/butadiene copolymers and ethylene/propylene/diene terpolymers and mixtures thereof.

3. The compound of claim 1 wherein said first rubber has a Tg higher than the Tg of said second rubber.

4. The compound of claim 1 wherein said first rubber is selected from the group consisting of solution polymerized styrene/butadiene copolymers, isoprene/butadiene copolymers and mixtures thereof.

5. The compound of claim 1 wherein said second rubber is selected from the group consisting of cis 1,4-polybutadiene and natural rubber.

6. The compound of claim 1 wherein said curatives include a sulfur vulcanization agent and at least one accelerator.

7. The compound of claim 1 wherein from 40 to 60 phr of a silica filler and from 20 to 50 phr of a carbon black are intimately dispersed with said first rubber compound to form said first nonproductive compound.

8. The compound of claim 1 wherein from 60 to 80 phr of silica filler is intimately dispersed with said second rubber compound to form said second nonproductive compound.

9. The composition of claim 1 wherein a silica coupling agent is intimately dispersed with said first and second nonproductive compounds.

10. The compound of claim 1 wherein said silica coupler is a sulfur containing organosilicon material.

11. The compound of claim 10 wherein said sulfur containing organosilicon compound is of the formula:

in which Z is selected from the group consisting of

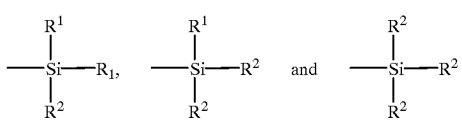

where
R[1] is an alkyl group of 1 to 4 carbon atoms, cyclohexyl or phenyl;

R² is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

12. The compound of claim 1 wherein said first and second nonproductive compounds are separately mixed at a rubber temperature of from 130° C. to 180° C. for a period of from 10 seconds to 20 minutes.

13. The compound of claim 1 wherein said heterogeneous silica/carbon black-filled rubber compound is derived from 60 to 80 parts by weight of said first productive compound and from 60 to 20 parts by weight of said second productive compound.

14. The compound of claim 1 wherein said heterogeneous silica/carbon black-filled rubber compound is derived from 60 to 80 parts by weight of said first productive compound and from 40 to 20 parts by weight of said second productive compound.

15. The compound of claim 1 wherein an additional rubber is present to form said first nonproductive compound.

16. The compound of claim 1 wherein an additional rubber is present to form said second nonproductive compound.

17. The compound of claim 1 wherein said carbon black is selected from the group consisting of N110, N121, N220, N231, N234, N242, N293, N299, S315, N326, N330, N332, N339, N343, N347, N351, N358, N375 and mixtures thereof.

18. The compound of claim 1 which is vulcanized at a temperature ranging from 100° C. to 200° C.

19. The compound of claim 18 which is in the form selected from the group consisting of a pneumatic tire, belt, hose, air spring, shoe product and motor mount.

20. A pneumatic tire having a tread comprised of the composition of claim 19.

* * * * *

UNITED STATES PATENT AND TRADEMARK OFFICE
CERTIFICATE OF CORRECTION

PATENT NO. : 6,355,719 B1  
DATED : March 12, 2002  
INVENTOR(S) : Filomeno Gennaro Corvasce et al.

It is certified that error appears in the above-identified patent and that said Letters Patent is hereby corrected as shown below:

<u>Column 3,</u>
Line 8, delete "5" after "of" and before "from"

Signed and Sealed this

Sixth Day of August, 2002

Attest:

JAMES E. ROGAN
*Attesting Officer*    *Director of the United States Patent and Trademark Office*